3,278,564
6,16-SUBSTITUTED PROGESTERONES
Richard T. Rapala, Indianapolis, Ind., assignor to Eli Lilly and Company, Indianapolis, Ind., a corporation of Indiana
No Drawing. Filed Dec. 26, 1961, Ser. No. 162,191
2 Claims. (Cl. 260—397.3)

This invention relates to novel steroids and to pharmaceutical compositions containing these steroids. More particularly, this invention relates to 6,16-disubstituted-progesterones which exhibit excellent antiendocrine activity and, in addition, are most useful as chemical intermediates.

In cases where an undesirable excess of steroidal hormone is being produced, treatment involves inhibition of the causative endocrine secretions with selected antiendocrine agents. The therapeutic effectiveness of such agents could be enhanced substantially if inactivation thereof, caused by metabolic degradation, could be reduced, or delayed.

One of the objects of this invention is to provide highly effective antiendocrine steroids—in particular, extremely effective antiestrogens. Another object is to provide steroidal antiendocrines which are quite resistant to metabolic degradation. A still further object is to provide novel pharmaceutical compositions containing the steroids of this invention. In addition, it is an object to provide novel steroids which are highly useful chemical intermediates. These and other objects of this invention appear more fully hereinafter.

The novel 6,16-progesterones of this invention are 6-alkyl-16-haloprogesterones and 6-halo-16-alkylprogesterones, and include the corresponding 19-nor derivatives. The halo and alkyl groups can be substituted in either the α- or β-configurations of carbons 6 and 16; however, it is preferred that they be substituted in the 6β,16α-configuration or the 6α,16α-configuration. The following general formulae are representative of the novel progesterones of this invention:

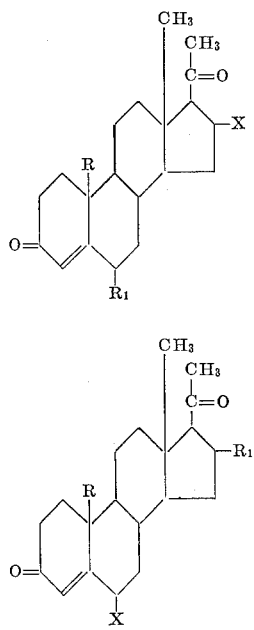

In the above formulae, R is hydrogen or methyl; $R_1$ is lower alkyl, i.e., containing 1 to 4 carbon atoms; and X is halo, e.g., chloro, bromo, fluoro, and the like. $R_1$ and X can be substituted in either the α- or β-configurations, the α- or 6β,16α-configurations being preferred.

A preferred embodiment of this invention comprises a 6-methyl-16-haloprogesterone, since such compounds can easily be prepared in one step from commercially available 6-methyl-$\Delta^{4,16}$-pregnadiene-3,20-dione. A progesterone that is representative of this preferred embodiment is 6α-methyl-16α-chloroprogesterone.

The compounds of this invention have antiestrogenic activity. For example, the α- or β-, 6-chloro and 6-fluoro derivatives of 16α-methylprogesterone are highly effective antiestrogens, exhibiting a high order of both parenteral and oral activity. Furthermore, these compounds do not possess oral progestational activity, and also are devoid of androgenic activity.

Consequently, the steroids can be formulated into highly effective pharmaceutical preparations, wherein the improvement comprises employing therein a 6,16-disubstituted-progesterone of this invention. One such composition comprises a pharmaceutical carrier and a physiologically adequate amount—in general, about 0.1 to 20 mg. and preferably 5 to 10 mg.—of the 6,16-disubstituted-progesterone described hereinabove.

Representative of the steroids of this invention are

6α-chloro-16α-methylprogesterone,
6α-fluoro-16α-methylprogesterone,
6α-bromo-16α-methylprogesterone,
6α-iodo-16α-methylprogesterone,
6α-chloro-16α-ethylprogesterone,
6α-fluoro-16α-propylprogesterone,
6α-methyl-16α-chloroprogesterone,
6α-propyl-16α-fluoroprogesterone,
6α-ethyl-16α-bromoprogesterone,
6α-chloro-16α-n-butylprogesterone, and the corresponding 6α-,16β-; 6β-, 16α-; and 6β-,16β-derivatives.

The following examples typify the preparation of the novel steroids of this invention.

*Example I.—Preparation of 6β-chloro-16α-methyl-progesterone*

To 1 g. of 16α-methyl-$\Delta^5$-pregnen-3β-ol-20-one were added 10 cc. of pyridine and 5 cc. of acetic anhydride. This solution was maintained at 25° C. overnight and was then poured into ice water. Thereafter, the solution was again brought to 25° C. and maintained at this temperature for 1 hour. A precipitate formed. The precipitated material was filtered, washed well with water, and dried in an oven under vacuum. The dried material, 16α-methyl-$\Delta^5$-pregnen-3β-ol-20-one acetate, weighed 1.1 g. and had a melting point of 179–181° C. This material (215 mg.) was dissolved in 30 ml. of chloroform and to the solution was added 0.06 cc. of pyridine at Dry Ice-acetone temperature. A 1 molar chlorine-carbon tetrachloride solution (1 cc.) was then gradually added to the solution. After swirling and maintaining the solution at room temperature for 1 hour, additional chloroform was added and the solution was washed with (1) dilute 5 percent hydrochloride solution, (2) 5 percent sodium carbonate solution, and (3) water. In each case the aqueous layers were discarded. The organic portion was dried over sodium sulfate, filtered, and the solvent evaporated. Crystallization of the residue from methanol yielded solid 16α-methyl-5α,6β-dichloropregnan-3β-ol-20-one acetate, weighing 70 mg., and having a melting point of 185–190° C., with softening at 179° C.

*Analysis.*—Calculated for $C_{24}H_{36}O_3Cl_2$: C, 65.01; H, 8.19. Found: C, 65.57; H, 8.29.

Hydrolysis of 250 mg. of 16α-methyl-5α,6β-dichloropregnan-3β-ol-20-one acetate, prepared as described above, was carried out by dissolving the acetate in 10 to 15 ml. of methanol and adding a solution of 0.225 g. potassium bicarbonate in 1 cc. of water. The mixed solutions were refluxed for one hour, thereafter concentrated to a small volume by evaporation in vacuo, and then diluted with water. The precipitate which formed after a short period was filtered, washed with water, and air dried. The purified solid, 16α-methyl-5α,6β-dichloropregnan-3β-ol-20-one, weighed 220 mg. and had a melting point of 175–178° C.

*Analysis.*—Calculated for $C_{22}H_{34}Cl_2O_2$: C, 65.82; H, 8.54. Found: C, 65.59; H, 8.80.

To 220 mg. of this 5α,6β-dichloro derivative, dissolved in 18 cc. of acetone at 0° C., was added 0.18 cc. of a 6 N $CrO_3$-$H_2SO_4$-acetone solution. The resulting solution was stirred magnetically for 5 minutes at 0° C. and then the reaction was terminated by pouring the solution into 80 cc. of ice water. After a half-hour, the solid that formed was filtered and washed thoroughly with water, then dried in vacuo for several hours to give 16α-methyl-5α,6β-dichloropregnan-3,20-dione, weighing 200 mg. and having a melting point of 170–179° C. (decomposed).

*Analysis.*—Calculated for $C_{22}H_{32}O_2Cl_2$: C, 66.16; H, 8.08. Found: C, 66.26; H, 8.19.

This 16α - methyl - 5α,6β - dichloropregnan - 3,20 - dione (200 mg.) was dissolved in 15 ml. of methanol and to the solution was added 115 mg. of sodium acetate. The solution was refluxed for two and one-half hours. The solvent was partially evaporated under vacuum and water was added to precipitate a white solid weighing 100 mg. and having a melting point of 254–258° C.

$$\lambda_{max.}^{Ethanol} \ 239 \ m\mu, \ \epsilon = 13{,}350$$

Recrystallization from Skelly B furnished 6β-chloro-16α-methylprogesterone.

*Example II.—Preparation of 6α-chloro-16α-methylprogesterone*

The compound produced in Example I, 6β-chloro-16α-methylprogesterone, was dissolved in glacial acetic acid. Dry HCl was bubbled through the resulting solution for one and one-half hours, and the solution was cooled to 25° C., at which temperature it remained for four hours. Thereafter, the solution was poured into ice water, whereupon a precipitate formed. This precipitate was collected by filtering and then washing the collected precipitate with water. Crystallization from methanol furnished 6α-chloro-16α-methylprogesterone, having a melting point of 179–183° C.

$$\lambda_{max.}^{Ethanol} \ 235 \ m\mu, \ \epsilon = 14{,}080$$

*Example III*

Following the procedure of Example I, 200 mg. of 16α-methyl-5α,6β-dichloropregnan-3,20-dione were prepared and dissolved in 12 ml. of glacial acetic acid. Dry hydrogen chloride gas was bubbled for two hours through this solution, while stirring and maintaining the solution at 0° C. The reaction was complete in two hours, and the reaction mixture was then poured into 75 g. of ice water. When the reaction mixture had cooled to 25° C., it was filtered and the precipitate that had formed was collected. This precipitate was washed, dried, and crystallized from ether to obtain 6α-chloro-16α-methylprogesterone, having a melting point of 189–192° C.

$$\lambda_{max.}^{Ethanol} \ 236 \ m\mu, \ \epsilon = 14{,}500$$

*Analysis.*—Calculated for $C_{22}H_{31}ClO_2$: C, 72.82; H, 8.61. Found: C, 72.81; H, 8.51.

*Example IV.—Preparation of 6α-methyl-16α-chloroprogesterone*

Three g. of 6α-methyl-$\Delta^{4,16}$-pregnadiene-3,20-dione were added to 125 ml. of chloroform (purified by washing with water and drying over sodium sulfate). This solution was cooled to 0° C. and dry HCl gas was bubbled through the solution for 8 minutes. The reaction mixture was then blanketed with nitrogen gas and the reaction vessel was cooled in an ice bath for two and one-half hours. In vacuo evaporation of the reaction mixture produced a semicrystalline mass. After filtration, this mass was crystallized from ether, yielding 2.49 g. of 6α-methyl-16α-chloroprogesterone, having a melting point of 160–165° C.

$$\lambda_{max.}^{Ethanol} \ 240 \ m\mu, \ \epsilon = 16{,}000$$

Recrystallization from ether yielded a sample having a melting point of 168–171° C.

*Analysis.*—Calculated for $C_{22}H_{31}ClO_2$: C, 72.82; H, 8.61. Found: C, 72.77; H, 8.60.

*Example V.—Preparation of 6β-chloro-16β-methylprogesterone*

Employing the procedure of Example I, with the exception that 16β-methyl-$\Delta^5$-pregnen-3β-ol-20-one was employed in place of the corresponding 16α-methyl derivative, 6β-chloro-16β-methyl-progesterone was prepared, having a melting point of 192–197° C.

$$\lambda_{max.}^{Ethanol} \ 239 \ m\mu, \ \epsilon = 13{,}900$$

*Example VI.—Preparation of 6α-chloro-16β-methylprogesterone*

The 6β-chloro-16β-methylprogesterone produced in Example V is converted to the 6α-chloro-16α-methylprogesterone, using the procedure of Example II.

The above examples present a variety of excellent procedures for preparing the compounds of this invention from various starting materials. However, all of the compounds of this invention can be prepared from readily available 6-alkyl-$\Delta^{4,16}$-pregnadiene-3,20-diones or 16-alkylpregnenolones by employing well-known standard procedures. For example, 6β-bromo-16β-methylprogesterone can be prepared from 16β-methylpregnenolone by acetylation, bromination, deacetylation, oxidation, and dehalogenation.

As has been stated above, the novel 6,16-disubstituted-progesterones of this invention are highly useful as chemical intermediates, since an 11α- or 11β-hydroxy group is readily introduced in position C-11 by the action of microorganisms, such as *Cunninghamella echinulata* or *Curvularia lunata;* for example, by employing the procedures set forth in U.S. 2,812,286 or 2,658,023. In this manner, the 6,16-difunctional progesterones of this invention are converted into highly useful corticosteroids. Although the above-mentioned patents employ specific microorganisms and procedures, it is to be understood that the introduction of an 11-hydroxy group can be effected by any method presently known to the art.

In addition to the aforesaid utilities, the novel 6,16-progesterones of this invention are effective antifungal agents, when applied topically in varying concentrations— the specific concentration being dependent upon the severity of the fungal infection. Furthermore, the compounds of this invention exhibit central nervous system depressant activity, thereby being useful as hypotensive agents, for example.

I claim:
1. A novel steroid of the group represented by the following formula:

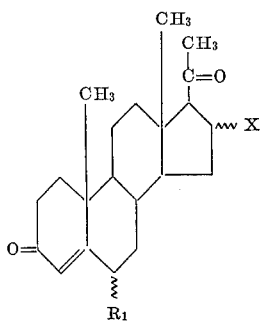

wherein $R_1$ is $C_1$–$C_4$ alkyl and X is halo.

2. 6α-methyl-16α-chloroprogesterone.

References Cited by the Examiner
UNITED STATES PATENTS
2,708,201   5/1955   Dodson et al. _____ 260—397.3
3,057,858   10/1962  Djerassi _____ 260—239.55

OTHER REFERENCES
Graber et al.: Chemistry and Industry, 1478 and 1479 (1960).
Bowers et al.: J.A.C.S., 82, 4007–4012 (1960).
Miramontes et al.: J.A.C.S., 82, 6135–6155 (1960).

LEWIS GOTTS, Primary Examiner.
IRVING MARCUS, Examiner.
G. E. LANDE, E. I. ROBERTS, Assistant Examiners.